(12) United States Patent
Maeda et al.

(10) Patent No.: US 12,049,689 B2
(45) Date of Patent: Jul. 30, 2024

(54) IRON-BASED SINTERED ALLOY VALVE SEAT

(71) Applicant: TPR Co., Ltd., Tokyo (JP)

(72) Inventors: Koki Maeda, Tokyo (JP); Fukutoshi Uchida, Tokyo (JP)

(73) Assignee: TPR Co., Ltd., Tokyo (JP)

( * ) Notice: Subject to any disclaimer, the term of this patent is extended or adjusted under 35 U.S.C. 154(b) by 0 days.

(21) Appl. No.: 18/279,539

(22) PCT Filed: Dec. 9, 2022

(86) PCT No.: PCT/JP2022/045437
§ 371 (c)(1),
(2) Date: Dec. 18, 2023

(65) Prior Publication Data
US 2024/0191332 A1    Jun. 13, 2024

(51) Int. Cl.
| | | |
|---|---|---|
| *C22C 38/58* | (2006.01) | |
| *B22F 3/00* | (2021.01) | |
| *B22F 3/16* | (2006.01) | |
| *B22F 3/26* | (2006.01) | |
| *C22C 33/02* | (2006.01) | |
(Continued)

(52) U.S. Cl.
CPC .............. *C22C 38/58* (2013.01); *B22F 3/004* (2013.01); *B22F 3/16* (2013.01); *B22F 3/26* (2013.01); *C22C 33/0242* (2013.01); *C22C 33/0285* (2013.01); *C22C 38/002* (2013.01); *C22C 38/04* (2013.01); *C22C 38/42* (2013.01); *C22C 38/44* (2013.01); *C22C 38/46* (2013.01); *C22C 38/52* (2013.01); *F01L 3/02* (2013.01); *B22F 2301/35* (2013.01); *B22F 2998/10* (2013.01); *B22F 2999/00* (2013.01)

(58) Field of Classification Search
None
See application file for complete search history.

(56) References Cited

U.S. PATENT DOCUMENTS

| | | | |
|---|---|---|---|
| 4,021,205 A | 5/1977 | Matsuda et al. | |
| 4,505,988 A | 3/1985 | Urano et al. | |
(Continued)

FOREIGN PATENT DOCUMENTS

| | | | |
|---|---|---|---|
| CN | 101517112 A | 8/2009 | |
| CN | 104428436 A | 3/2015 | |
(Continued)

OTHER PUBLICATIONS

English language machine translation of JP-2018178208-A. Generated Feb. 7, 2024. (Year: 2024).*

(Continued)

*Primary Examiner* — Brian D Walck
(74) *Attorney, Agent, or Firm* — MARSHALL, GERSTEIN & BORUN LLP (57) ABSTRACT

The present invention solves a novel problem of corrosive wear that occurs in the use of a valve seat in an internal combustion engine using a hydrogen gas fuel. The problem is solved by an iron-based sintered alloy valve seat used in an internal combustion engine using a hydrogen gas fuel, in which the Cr content is 6% by mass to 23% by mass, the Mo content is 5% by mass to 20% by mass, the Cu content is 10% by mass to 23% by mass, the Co content is 3% by mass or more, and a total content of Cr, Mo, and Co is 14% by mass to 47% by mass.

9 Claims, 6 Drawing Sheets

(51) Int. Cl.
    *C22C 38/00*     (2006.01)
    *C22C 38/04*     (2006.01)
    *C22C 38/42*     (2006.01)
    *C22C 38/44*     (2006.01)
    *C22C 38/46*     (2006.01)
    *C22C 38/52*     (2006.01)
    *F01L 3/02*     (2006.01)

(56) References Cited

U.S. PATENT DOCUMENTS

| | | | |
|---|---|---|---|
| 5,784,681 | A | 7/1998 | Purnell et al. |
| 2010/0190025 | A1 | 7/2010 | Farthing et al. |
| 2015/0076386 | A1 | 3/2015 | Qiao et al. |
| 2015/0152753 | A1 | 6/2015 | Hashimoto et al. |
| 2020/0284173 | A1* | 9/2020 | Oikawa .................. B22F 5/106 |
| 2021/0215071 | A1* | 7/2021 | Oikawa .................... F01L 3/02 |

FOREIGN PATENT DOCUMENTS

| | | | |
|---|---|---|---|
| CN | 105579594 | A | | 5/2016 |
| JP | S51137004 | U | | 11/1976 |
| JP | S5719188 | B2 | | 4/1982 |
| JP | S5877114 | A | | 5/1983 |
| JP | S5925959 | A | | 2/1984 |
| JP | H05202451 | A | | 8/1993 |
| JP | H08134608 | A | | 5/1996 |
| JP | H09511020 | A | | 11/1997 |
| JP | H09329006 | A | | 12/1997 |
| JP | 2016069734 | A | * | 5/2016 |
| JP | 2018178208 | A | * | 11/2018 |
| JP | 2022050275 | A | | 3/2022 |
| WO | WO-2009/024809 | A1 | | 2/2009 |

OTHER PUBLICATIONS

English language machine translation of JP-2016069734-A. Generated Feb. 7, 2024. (Year: 2024).*

Office Action in JP Application No. 2022-576536 dated Feb. 14, 2023, 6 pages.

Search Report in International Application No. PCT/JP2022/045437 dated Feb. 21, 2023, 4 pages.

Office Action in CN Application No. 202280021742.5 dated Jan. 26, 2024, 7 pages.

* cited by examiner

Fig.6

IRON-BASED SINTERED ALLOY VALVE SEAT

TECHNICAL FIELD

The present invention relates to an iron-based sintered alloy valve seat used in an internal combustion engine using a hydrogen gas fuel.

BACKGROUND ART

In recent years, it is demanded to reduce $CO_2$ emissions and fossil fuel usage and, from the standpoint of environmental load, technologies relating to internal combustion engines, in which hydrogen gas or a fuel obtained by mixing hydrogen gas with other fuel (hereinafter, these are also collectively referred to as "hydrogen gas fuel") is used as a fuel, have been studied.

In connection with this, for example, Patent Document 1 discloses, as a member used in a hydrogen engine, a member on which a coating layer formed of stainless steel is arranged for the purpose of inhibiting hydrogen embrittlement fracture.

Meanwhile, a valve seat on which a valve is seated in an internal combustion engine is demanded to have wear resistance at higher temperatures and exhibit superior heat transfer performance for improvement in the fuel economy of a gasoline engine. In response to this demand, Patent Document 2 discloses a valve seat in which hard particles formed of a Co-based alloy are dispersed in a matrix formed of an Fe alloy such as high-speed steel, and Cu or a Cu alloy is infiltrated into pores.

RELATED ART DOCUMENTS

Patent Documents

[Patent Document 1] Japanese Unexamined Utility Model Publication No. S51-137004
[Patent Document 2] Japanese Unexamined Patent Application Publication No. 2022-050275

SUMMARY OF THE INVENTION

Problems to be Solved by the Invention

According to the studies conducted by the present inventors, in an internal combustion engine using a hydrogen gas fuel, combustion is clean and likely to selectively generate water and NOx, which is different from the case of using a hydrocarbon-based fuel. The generated water and NOx cause the generation of water reflux bearing an acidic atmosphere inside the engine. Therefore, it was thought that excessive wear occurs in a valve seat required to have wear resistance at high temperatures and exhibit high heat transfer performance, such as the one disclosed in Patent Document 2.

The present invention solves such a novel problem that occurs in the use of a sintered valve seat in an internal combustion engine using a hydrogen gas fuel.

Means for Solving the Problems

The present inventors intensively studied to solve the above-described problem, and focused on that the face surface of a valve seat subjected to repeated high-speed contact with a valve in an internal combustion engine using a hydrogen gas fuel is likely to be beaten and worn by the corrosive effect unique to an internal combustion engine using a hydrogen gas fuel. In order to improve the corrosive wear resistance of a material used for the face surface of such a valve seat, the present inventors studied the compositions of matrices and hard particles of sintered valve seats, as well as the distribution of specific elements in sintered valve seats. Among the specific elements, Cr forms a passivation film against nitric acid and thereby improves the corrosion resistance; however, since Cr may deteriorate the sinterability and reduce the matrix strength when added in an excessive amount, the present inventors studied the formulation and the distribution of Cr with other elements. Further, the present inventors inhibited a reduction in the matrix strength, which is caused by internal corrosion, by filling pores through Cu infiltration, thereby completing the invention of a sintered valve seat that satisfies both corrosive wear resistance and strength at high levels.

One mode of the present invention is a sintered valve seat used in an internal combustion engine using a hydrogen gas fuel, in which the Cr content is 6% by mass to 23% by mass, the Mo content is 5% by mass to 20% by mass, the Cu content is 10% by mass to 23% by mass, the Co content is 3% by mass or more, and a total content of Cr, Mo, and Co is 14% by mass to 47% by mass.

In the sintered valve seat, it is preferred that: Cr-containing hard particles A and Mo-containing hard particles B be dispersed in a matrix; the hard particles A contain 8% by mass to 32% by mass of Cr; the matrix contain 3% by mass to 25% by mass of Cr; the hard particles B contain 50% by mass to 75% by mass of Mo; and the valve seat be infiltrated with Cu. It is also preferred that: the hard particles A contain Cr, Co, Mo, Ni, and C, with the remainder being Fe and impurities, and have a hardness of 550HV0.1 to 1,050HV0.1; and the hard particles B have a hardness of 850HV0.1 to 1,600HV0.1.

With regard to the matrix of the sintered valve seat, it is preferred that Cr contained therein contain a Cr carbide.

Further, in the sintered valve seat, when a cross-section obtained by cutting the valve seat in a direction perpendicular to the circumferential direction is observed, it is preferred that the valve seat have a porosity of 3% or less and a Cu area ratio of 8% to 20%. Still further, in the valve seat, when a component analysis is performed under prescribed conditions for an analysis area of 25 µm×25 µm at a cross-section obtained by cutting the valve seat in a direction perpendicular to the circumferential direction, it is preferred that a region where the Cr content is less than 2%, the Mo content is less than 30%, and the Cu content is less than 2% be absent, and it is also preferred that a region where the Cr content is less than 2% be absent, except for a region occupied by the hard particles B and a region infiltrated with Cu.

Yet still further, the sintered valve seat preferably has a surface hardness of HRC40 to HRC60.

These sintered valve seats are preferably valve seats that are each arranged on an exhaust side of a spark ignition engine.

Effects of the Invention

According to the present invention, a sintered valve seat which enables to inhibit corrosive wear of a valve seat that may occur in an internal combustion engine using a hydrogen gas fuel can be provided.

MODE FOR CARRYING OUT THE INVENTION

One embodiment of the present invention is an iron-based sintered alloy valve seat (hereinafter, also simply referred to as "sintered valve seat") used in an internal combustion engine using a hydrogen gas fuel.

<Hydrogen Gas Fuel>

The term "hydrogen gas fuel" used herein refers to a fuel consisting of only hydrogen gas, or a fuel obtained by mixing hydrogen gas and other hydrocarbon-based fuel. The ratio of hydrogen gas in the whole fuel is 50% or higher, and may be 60% or higher, or 70% or higher.

<Matrix>

In the sintered valve seat, it is preferred that hard particles A and B be dispersed in a matrix having a Cr content of 3% by mass to 25% by mass.

The Cr content in the matrix is not less than 3% by mass, preferably not less than 4% by mass, more preferably not less than 5% by mass, still more preferably not less than 10% by mass. An upper limit thereof is not particularly limited as long as the Cr content is in a range of 6% by mass to 23% by mass in the composition of the whole sintered valve seat as described below; however, it is preferably 25% by mass or less in the matrix. By controlling the Cr content to be in the above-described range, corrosive wear of the valve seat can be inhibited.

As one mode of the matrix, the matrix may be in the mode of having a high Cr content and, for example, a matrix having a Cr content of 20% by mass to 25% by mass is most preferred. A matrix having such a high Cr content is preferred from the standpoint of the corrosive wear resistance of the valve seat.

Cr contained in the matrix is preferably a Cr carbide. By incorporating a Cr carbide into the matrix, the hardness of the matrix is improved, so that wear resistance can be ensured.

The Co content in the matrix is preferably 20% by mass or less, more preferably 17% by mass or less. A lower limit thereof is not particularly limited, and it may be usually 5% by mass or more. By controlling the Co content to be in the above-described range, the valve seat can be ensured to have a sufficient strength.

Examples of other elements that may be contained in the matrix include C, Mo, Ni, V, W, Mn, and S, and the remainder is unavoidable impurities and Fe.

The matrix preferably has a hardness of 400HV0.1 to 800HV0.1. By this, the valve seat can be ensured to have a sufficient strength, and the wear resistance can be improved.

<Hard Particles A>

The hard particles A are not particularly limited as long as they are Cr-containing particles, and the hard particles A preferably contain Cr in an amount of 8% by mass to 32% by mass. One mode of the hard particles A is, for example, an alloy formed of Cr, Co, Mo, Ni, and C, with the remainder being Fe and impurities. It is noted here that the alloy may also contain elements other than these metals.

The hard particles A are not particularly limited in terms of both shape and particle size, and have a diameter (major axis) of preferably in a range of 5 μm to 200 μm, more preferably in a range of 10 μm to 150 μm.

The shape of the hard particles A can be checked by observing a cross-section of the valve seat under a microscope. Further, the diameter of the hard particles A can be measured by observation under a microscope and, when the hard particles A have an amorphous shape or a fiber shape, the major axis thereof is taken as the diameter.

The hard particles A have a hardness of preferably 550HV0.1 to 1,050HV0.1. By using hard particles having a hardness in this range, the wear resistance is improved.

The content of the hard particles A in the sintered valve seat is not particularly limited as long as the Cr amount in the sintered valve seat is satisfied; however, it is usually in a range of 20 to 50% by mass, and may be in a range of 25 to 45% by mass, or 30 to 40% by mass.

<Hard Particles B>

The hard particles B are not particularly limited as long as they are Mo-containing particles, and the hard particles B preferably contain Mo in an amount of 50% by mass to 75% by mass. One mode of the hard particles B is, for example, an Fe—Mo alloy. It is noted here that the alloy may also contain elements other than these metals, or may be an alloy formed of Mo, Fe, and impurities.

The hard particles B is not particularly limited in terms of both shape and particle size, and have a diameter (major axis) of preferably in a range of 5 μm to 200 μm, more preferably in a range of 10 μm to 150 μm.

The shape, the hardness, and the diameter of the hard particles B can be measured in the same manner as those of the hard particles A.

The hard particles B have a hardness of preferably 850HV0.1 to 1,600HV0.1. By using hard particles having a hardness in this range, the wear resistance is improved.

The content of the hard particles B in the sintered valve seat is not particularly limited as long as the Mo amount in the sintered valve seat is satisfied; however, it is preferably in a range of 5% by mass to 16% by mass.

The valve seat may also contain a solid lubricant, a mold release agent, and the like in addition to the matrix and the hard particles A and B, as long as the effects of the present invention are not impaired.

Examples of the solid lubricant include C, MnS, $MoS_2$, and $CaF_2$. Thereamong, MnS is preferably incorporated since it improves the machining performance.

Examples of the mold release agent include ZnSt (zinc stearate), and examples of a fluidity improver include $SiO_2$.

<Sintered Valve Seat>

The Cr content in the sintered valve seat is 6% by mass to 23% by mass. By controlling the Cr content to be in this range, corrosive wear of the valve seat can be inhibited. The Cr content in the sintered valve seat is preferably 8% by mass to 23% by mass, most preferably 13% by mass to 23% by mass.

The Mo content in the sintered valve seat is 5% by mass to 20% by mass. By controlling the Mo content to be in this range, corrosive wear of the valve seat can be inhibited. The Mo content in the sintered valve seat is preferably 7% by mass to 17% by mass.

The Co content in the sintered valve seat is 3% by mass or more. By controlling the Co content to be in this range, corrosive wear of the valve seat can be inhibited. The Co content in the sintered valve seat is preferably 18% by mass or less, more preferably 4% by mass to 15% by mass.

In the sintered valve seat, a total content of Cr, Mo, and Co is 14% by mass to 47% by mass. By controlling the total content of Cr, Mo, and Co to be in this range, corrosive wear of the valve seat can be inhibited. The total content of Cr, Mo, and Co is preferably 28% by mass to 47% by mass.

By further incorporating MnS into the sintered valve seat, favorable machining performance can be obtained.

The sintered valve seat has a density of preferably 7.0 $g/cm^2$ to 8.5 $g/cm^2$, more preferably 7.5 $g/cm^2$ to 8.2 $g/cm^2$. When the density is in this range, the sintered valve seat is moderately infiltrated with Cu and exhibit favorable heat transfer performance.

The sintered valve seat has a thermal conductivity of preferably 35 W/m·K or higher.

In the sintered valve seat, Cu is infiltrated into pores of the matrix. The amount of Cu in the sintered valve seat is preferably 10% by mass to 23% by mass, more preferably 10% by mass to 20% by mass. By the infiltration of Cu, pores are closed and the porosity, which is determined by observation of a cross-section of the sintered valve seat, can be reduced to 3% or less, and it is more preferred that the porosity be reduced to 2% or less. Further, the Cu area ratio, which is determined by observation of a cross-section of the sintered valve seat, may be 8% to 20%, and it is more preferred that the Cu area ratio be 9% to 17% since this enables to inhibit a reduction in the strength of the matrix that is caused by the progress of internal corrosion, and to thereby improve the corrosive wear resistance. This is also preferred from the standpoint of heat transfer performance.

The corrosion resistance of the sintered valve seat can be improved by incorporating a large amount of Cr into the matrix; however, a large amount of Cr may cause a reduction in the strength of the matrix due to, for example, a reduction in the green compact strength during molding and stagnant dispersion and solid-solution formation during sintering. On the other hand, the strength of the matrix can be maintained by performing Cu infiltration.

In the sintered valve seat, when a component analysis is performed for an analysis area of 25 μm×25 μm at a cross-section obtained by cutting the valve seat in a direction perpendicular to the circumferential direction, it is preferred that a region corresponding to either of the following (1) and (2) be absent, and it is more preferred that a region corresponding to both of the following (1) and (2) be absent:

(1) a region where the Cr content is less than 2%, the Mo content is less than 30%, and the Cu content is less than 2%, and (2) a region where the Cr content is less than 2%, excluding any region occupied by the hard particles B and any region infiltrated with Cu.

The absence of a region corresponding to either of the above (1) and (2) means that Cr, Mo, and Cu exist uniformly in the sintered valve seat, and the effects of the present invention can be sufficiently exerted when Cr exists uniformly in the sintered valve seat, except in a region occupied by the hard particles B and a region infiltrated with Cu.

The component analysis is performed under the following conditions.

<Conditions>

Measurement apparatus: electron microscope SU3800, manufactured by Hitachi, Ltd.

EDS: UltimMax 65, manufactured by Oxford Instruments, plc.

Measurement conditions:
Accelerating voltage=15 kV
Spot intensity=80
WD (working distance)=10 mm The sintered valve seat preferably has a surface Rockwell hardness (HRC) of HRC40 to HRC60. By controlling the surface hardness to be in this range, the sintered valve seat can be ensured to have an appropriate strength as a valve seat, and the wear resistance can be improved.

<Production Method>

A method of producing a sintered valve seat infiltrated with Cu will now be described.

With regard to a sintered valve seat infiltrated with Cu, a method of producing a sintered valve seat, which method includes: the molding step of molding a raw material powder containing matrix raw materials and hard particles to obtain a molded body; the sintering step of sintering the thus obtained molded body; and the infiltration step of infiltrating Cu, is also one mode of the present invention.

The raw material powder used in the molding step contains matrix raw materials and hard particles and, as required, further contains a solid lubricant and a mold release agent. As the matrix raw materials, for example, a Co powder, a Cr powder, a Mo powder, and an Fe alloy powder can be used in addition to an Fe powder serving as a matrix core. Further, for example, a powder containing C, Ni, V, W, and Mn may be used as well.

A mixing ratio of these powders is not particularly limited as long as it is in a range in which a sintered body that can be used as a valve seat is obtained.

The average particle size of the raw material powder is not particularly limited; however, it is usually about 10 to 150 μm, and the use of a raw material powder having an average particle size in this range is likely to allow the density of the resulting sintered body to be in an appropriate range, which is preferred.

A molding method is also not particularly limited and, for example, the raw material powder may be filled into a mold and molded by press molding or the like such that the density of the resulting molded body is in an appropriate range.

In the sintering step, the thus obtained molded body is sintered. The sintering temperature is not particularly limited as long as a sintered body can be obtained by sintering the raw material powder, and it is, for example, 1,060° C. to 1,300° C. The atmosphere during the sintering is preferably, but not limited to, a vacuum atmosphere or an inert gas atmosphere such as nitrogen gas or argon gas, and may be a reducing atmosphere.

The sintering time is not particularly limited and may be, for example, 10 minutes to 2 hours, preferably 15 minutes to 1 hour.

The infiltration step is the step of infiltrating Cu into pores of the sintered body. In the present invention, Cu is infiltrated in the sintering step. It is noted here, however, that an infiltration method is not particularly limited, and any known method may be employed.

<Arrangement of Sintered Valve Seat>

The sintered valve seat of the present embodiment has a high corrosive wear resistance and, therefore, it is preferably used as a valve seat that is arranged on a surface of a cylinder head coming into contact with a valve in an internal combustion engine using a hydrogen gas fuel, particularly as a valve seat on the exhaust side of a spark ignition engine.

The sintered valve seat of the present embodiment can also be used as a laminate with a support member formed of other material. In the case of such a laminate, the sintered valve seat member of the present embodiment is arranged on the side in which a valve is seated, and the support member is arranged on the side fitted with the cylinder head. The support member is not particularly limited, and any material having a composition that further improves the thermal conductivity may be used. As a case of improving the thermal conductivity, for example, a case of increasing the Cu content and a case of reducing the amount of alloy element may be considered.

EXAMPLES

The present invention will now be described in more detail by way of Experimental Examples; however, the present invention is not limited by the results of the below-described Experimental Examples.

A raw material powder of a valve seat, which contained matrix raw materials, hard particles A and B, a solid lubricant, and a mold release agent, was mixed, filled into a mold, and then compression molded using a press. As the hard particles A and B, the particles shown in Table 2 were used. The thus obtained green compact was sintered and infiltrated with Cu to obtain a sintered alloy. The thus obtained sintered alloy was confirmed to have the overall composition shown in Table 1. A component analysis method was as follows.
(1) Elements Other than C
Measurement apparatus: electron microscope SU3800, manufactured by Hitachi, Ltd.
EDS: UltimMax 65, manufactured by Oxford Instruments, plc.
Measurement conditions:
Accelerating voltage=15 kV
Spot intensity=80
WD (working distance)=10 mm
Analysis area=0.5 mm×0.5 mm
(2) Only C
Measurement apparatus: carbon-sulfur analyzer EMIA-PRO, manufactured by HORIBA, Ltd.
<Porosity>
A valve seat of interest was cut in a direction perpendicular to the circumferential direction, the resulting cross-section was buffed, and a color image thereof was taken under a metallographic microscope at a magnification of ×500. This color image was binarized using an image analysis software, and the ratio of the pore area with respect to the total area of the observation field was calculated to determine the pore area ratio.
<Cu Area Ratio>
A valve seat of interest was cut in a direction perpendicular to the circumferential direction, the resulting cross-section was buffed and etched with nital, and a color image thereof was taken under a metallographic microscope at a magnification of ×500. An HSV analysis was performed to adjust the saturation and the brightness, and Cu regions were extracted, after which the area ratio of Cu phase with respect to the total area of the observation field was calculated by binarization to determine the Cu area ratio.

It is noted here that the composition, the Cu area ratio, and the porosity are each an average of values measured at three spots.
[Table 1]

TABLE 1

| Material | Total Composition (%) | | | | | | | | | | |
|---|---|---|---|---|---|---|---|---|---|---|---|
| | Cr | Mo | Cu | Co | Ni | C | V | W | Mn | S | Other |
| Example 1 | 6.0 | 9.9 | 18.1 | 11.1 | 2.0 | 1.4 | 1.9 | 5.8 | 0.8 | 0.5 | 0.1 |
| Example 2 | 6.1 | 5.8 | 10.1 | 3.0 | 1.6 | 1.0 | 1.3 | 4.3 | 0.9 | 0.5 | 0.1 |
| Example 3 | 6.3 | 8.0 | 22.3 | 4.0 | 1.6 | 1.0 | 1.3 | 4.3 | 0.9 | 0.5 | 0.1 |
| Example 4 | 6.4 | 8.1 | 10.0 | 10.9 | 1.8 | 0.6 | 0.7 | 2.5 | 1.2 | 0.0 | 0.1 |
| Example 5 | 6.5 | 10.8 | 10.1 | 10.1 | 1.8 | 0.9 | 0.2 | 1.2 | 1.2 | 0.0 | 0.1 |
| Example 6 | 6.8 | 14.8 | 16.8 | 4.0 | 1.6 | 0.9 | 1.2 | 4.0 | 0.8 | 0.5 | 0.1 |
| Example 7 | 8.5 | 19.8 | 19.1 | 13.6 | 3.5 | 1.6 | 1.6 | 4.4 | 0.6 | 0.4 | 0.1 |
| Example 8 | 10.4 | 17.9 | 17.2 | 15.8 | 3.8 | 1.9 | 1.2 | 3.2 | 2.2 | 1.4 | 1.0 |
| Example 9 | 10.6 | 15.1 | 17.1 | 16.7 | 3.8 | 1.6 | 1.7 | 4.5 | 2.2 | 1.4 | 3.0 |
| Example 10 | 11.9 | 15.7 | 11.8 | 17.3 | 3.2 | 2.1 | 1.5 | 4.5 | 0.6 | 0.3 | 0.1 |
| Example 11 | 12.0 | 19.8 | 14.1 | 12.0 | 3.2 | 1.9 | 0.8 | 2.8 | 0.6 | 0.4 | 0.1 |
| Example 12 | 13.1 | 7.5 | 10.3 | 8.1 | 1.8 | 1.4 | 0.3 | 0.6 | 0.1 | 0.0 | 0.1 |
| Example 13 | 16.6 | 16.5 | 10.0 | 9.8 | 3.2 | 1.9 | 0.7 | 1.2 | 0.3 | 0.2 | 0.5 |
| Example 14 | 18.0 | 7.4 | 14.1 | 4.1 | 1.6 | 1.7 | 1.1 | 1.8 | 0.4 | 0.3 | 0.4 |
| Example 15 | 18.1 | 14.5 | 16.9 | 14.3 | 3.8 | 2.4 | 1.3 | 1.4 | 1.1 | 0.9 | 3.0 |
| Example 16 | 22.1 | 10.8 | 19.9 | 13.9 | 2.1 | 1.4 | 1.3 | 1.4 | 2.2 | 1.4 | 3.0 |
| Example 17 | 22.8 | 12.6 | 16.8 | 11.5 | 4.6 | 2.1 | 1.2 | 1.6 | 0.3 | 0.2 | 0.2 |
| Comparative Example 1 | 3.2 | 3.8 | 0.0 | 5.8 | 0.9 | 0.6 | 0.0 | 0.0 | 0.7 | 0.5 | 0.1 |
| Comparative Example 2 | 4.0 | 8.0 | 11.0 | 4.0 | 1.0 | 1.0 | 0.5 | 2.0 | 1.0 | 0.0 | 1.0 |
| Comparative Example 3 | 4.5 | 8.5 | 7.1 | 2.3 | 0.5 | 0.9 | 1.4 | 3.0 | 0.9 | 0.5 | 0.1 |
| Comparative Example 4 | 5.5 | 6.0 | 0.0 | 10.0 | 2.0 | 1.1 | 0.0 | 0.0 | 1.0 | 0.7 | 1.0 |

TABLE 1-continued

| Material | Fe | Total Composition (%) Cr + Mo + Co | Matrix Cr (%) | Hard Particle A | Hard Particle B | Cu Area Ratio (%) | Porosity (%) | Hardness (HRC) | Corrosion Ratio |
|---|---|---|---|---|---|---|---|---|---|
| Example 1 | Remainder | 27.0 | 3.0 | A2 | B1 | 18.1 | 0.8 | 44 | 1.00 |
| Example 2 | Remainder | 14.9 | 4.4 | A1 | B1 | 12.1 | 0.9 | 41 | 0.99 |
| Example 3 | Remainder | 18.2 | 6.5 | A1 | B1 | 20.0 | 0.8 | 45 | 0.94 |
| Example 4 | Remainder | 25.4 | 6.7 | A1 | B1 | 11.7 | 1.0 | 49 | 0.94 |
| Example 5 | Remainder | 27.4 | 6.8 | A1 | B1 | 12.0 | 0.9 | 50 | 0.97 |
| Example 6 | Remainder | 25.6 | 4.2 | A2 | B5 | 17.1 | 0.9 | 52 | 0.97 |
| Example 7 | Remainder | 41.9 | 7.0 | A2 | B4 | 16.2 | 0.8 | 57 | 0.75 |
| Example 8 | Remainder | 44.1 | 12.2 | A1 | B1 | 14.1 | 1.1 | 52 | 0.92 |
| Example 9 | Remainder | 42.4 | 9.3 | A4 | B1 | 12.0 | 1.4 | 51 | 0.71 |
| Example 10 | Remainder | 44.8 | 4.0 | A4 | B1 | 8.6 | 2.6 | 54 | 0.81 |
| Example 11 | Remainder | 43.8 | 4.2 | A4 | B2 | 14.2 | 1.1 | 57 | 0.83 |
| Example 12 | Remainder | 28.7 | 12.6 | A2 | B3 | 12.0 | 0.9 | 46 | 0.32 |
| Example 13 | Remainder | 42.9 | 20.0 | A2 | B3 | 9.8 | 1.7 | 55 | 0.43 |
| Example 14 | Remainder | 29.5 | 20.0 | A2 | B2 | 15.8 | 1.1 | 50 | 0.36 |
| Example 15 | Remainder | 46.9 | 21.0 | A2 | B2 | 12.9 | 1.2 | 49 | 0.27 |
| Example 16 | Remainder | 46.8 | 24.6 | A3 | B3 | 16.3 | 1.3 | 50 | 0.20 |
| Example 17 | Remainder | 46.9 | 24.0 | A4 | B1 | 13.9 | 1.8 | 59 | 0.20 |
| Comparative Example 1 | Remainder | 12.8 | 0.0 | A1 | — | 0.0 | 18.0 | 29 | 1.50 |
| Comparative Example 2 | Remainder | 16.0 | 1.7 | A1 | B1 | 11.6 | 2.2 | 48 | 1.13 |
| Comparative Example 3 | Remainder | 15.3 | 4.0 | A1 | B1 | 7.5 | 5.5 | 44 | 1.30 |
| Comparative Example 4 | Remainder | 21.5 | 3.4 | A1 | — | 0.0 | 14.0 | 31 | 1.38 |

TABLE 2

| Hard Particle | Total Composition (mass %) | | | | | | | Hardness (HV) |
|---|---|---|---|---|---|---|---|---|
| | Cr | Mo | Co | Ni | C | Other | Fe | |
| A1 | 8~15 | 10~15 | 15~20 | 6~10 | 1~3 | 2 or less | Remainder | 550~700 |
| A2 | 15~20 | 15~20 | 20~25 | 6~10 | 1~3 | 2 or less | Remainder | 650~800 |
| A3 | 20~25 | 20~25 | 25~30 | 6~10 | 2~4 | 2 or less | Remainder | 750~950 |
| A4 | 25~30 | 25~30 | 30~35 | 6~10 | 2~4 | 2 or less | Remainder | 850~1050 |
| B1 | — | 50~55 | — | — | — | 1 or less | Remainder | 850~1050 |
| B2 | — | 55~60 | — | — | — | 1 or less | Remainder | 1000~1200 |
| B3 | — | 60~65 | — | — | — | 1 or less | Remainder | 1150~1350 |
| B4 | — | 65~70 | — | — | — | 1 or less | Remainder | 1300~1500 |
| B5 | — | 70~75 | — | — | — | 1 or less | Remainder | 1400~1600 |

<Component Analysis>

When the valve seats of Examples 1 to 7 were each cut in a direction perpendicular to the circumferential direction and the resulting cross-section was buffed and subjected to a component analysis of a 25 μm×25 μm analysis area, a region having a Cr content of less than 2%, a Mo content of less than 30%, and a Cu content of less than 2% was absent. In addition, a region having a Cr content of less than 2% was absent, except for regions occupied by the hard particles B and regions infiltrated with Cu.

On the other hand, the valve seats of Comparative Examples 1 and 2 included a region having a Cr content of less than 2%, a Mo content of less than 30%, and a Cu content of less than 2%. In addition, the valve seats of Comparative Examples 1 and 2 included a region having a Cr content of less than 2%, excluding any region occupied by the hard particles B and any region infiltrated with Cu.

<Conditions>

Measurement apparatus: electron microscope SU3800, manufactured by Hitachi, Ltd.

EDS: UltimMax 65, manufactured by Oxford Instruments, plc.

Measurement conditions:

Accelerating voltage=15 kV

Spot intensity=80

WD (working distance)=10 mm

Next, for each of the thus obtained valve seats, the amount of corrosion was checked by a simple nitric acid immersion test.

<Simple Nitric Acid Immersion Test>

Immersion liquid: nitric acid, pH=1.86

Immersion liquid temperature: 70° C.

Immersion time: 10 hours

It is noted here that the amount of corrosion was determined in terms of weight reduction rate.

Figure 1:
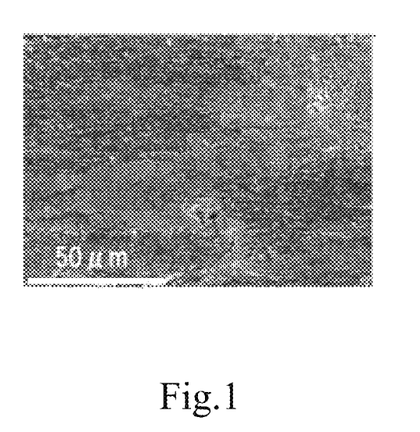
FIG. 1 is a cross-sectional structure image of the valve seat of Comparative Example 3, which was taken after a simple nitric acid immersion test (drawing substitute).
Figure 2:
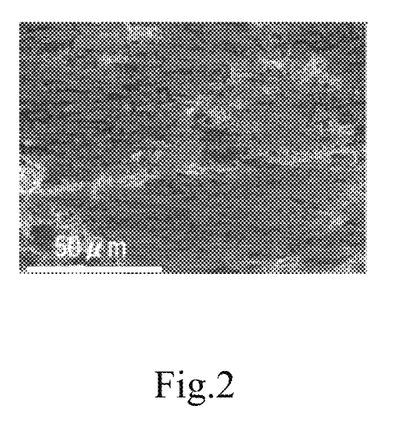
FIG. 2 is a cross-sectional structure image of the valve seat of Example 15, which was taken after a simple nitric acid immersion test (drawing substitute).

Table 1 shows the amount of corrosion for Examples and Comparative Examples, taking the amount of corrosion of the valve seat of Example 1 as 1. In addition, surface SEM images of the valve seats of Comparative Example 3 and Example 15, which were taken after the simple nitric acid immersion test, are provided in FIGS. 1 and 2. FIG. 1 shows Comparative Example 3, and FIG. 2 shows Example 15.

The arrows in FIG. 1 each indicate exposure of a carbide, i.e. a thickness-reduced portion of the matrix. A thickness reduction was observed in Comparative Example 3; however, hardly any thickness reduction was confirmed in Example 15.

The sintered valve seat of the present embodiment does not have a Cr-deficient region in the matrix, except for a region occupied by the hard particles B and/or a region infiltrated with Cu; therefore, the sintered valve seat of the present embodiment can exhibit an improved wear resistance as a sintered valve seat to be used in an internal combustion engine using a hydrogen fuel. In the matrix, Cr containing a Cr carbide was present.

Figure 3:
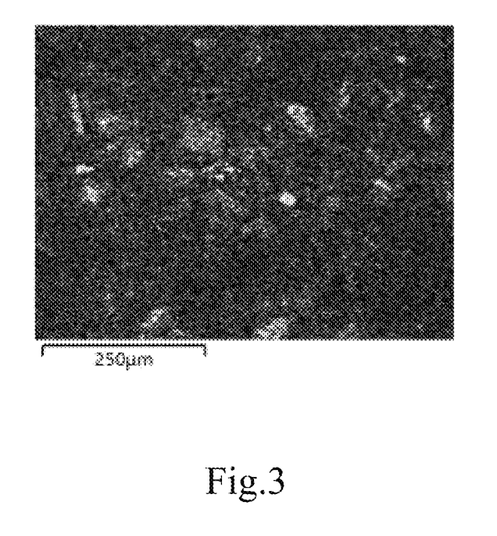
FIG. 3 is an SEM image of Comparative Example 4 (drawing substitute).
Figure 4:
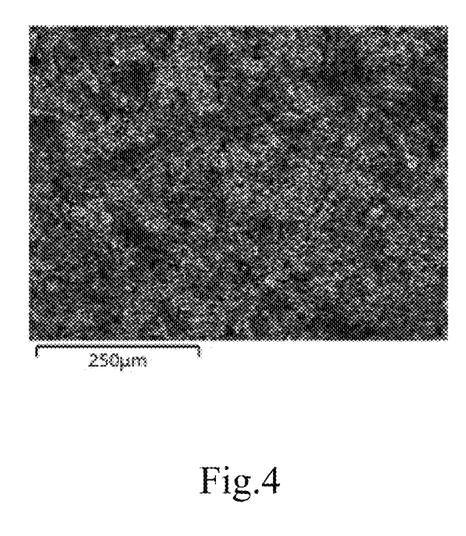
FIG. 4 is an SEM image of Example 15 (drawing substitute).
Figure 5:
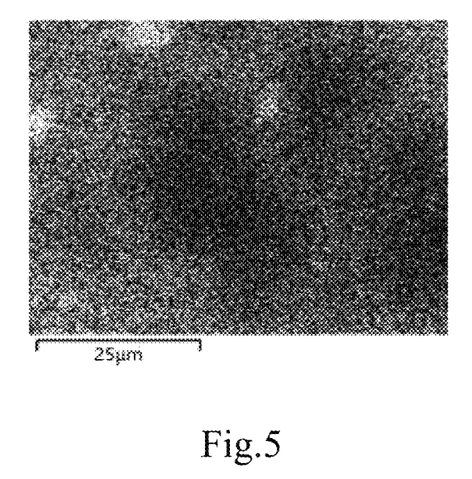
FIG. 5 is an SEM image of the matrix portion of Comparative Example 4 (drawing substitute).
Figure 6:
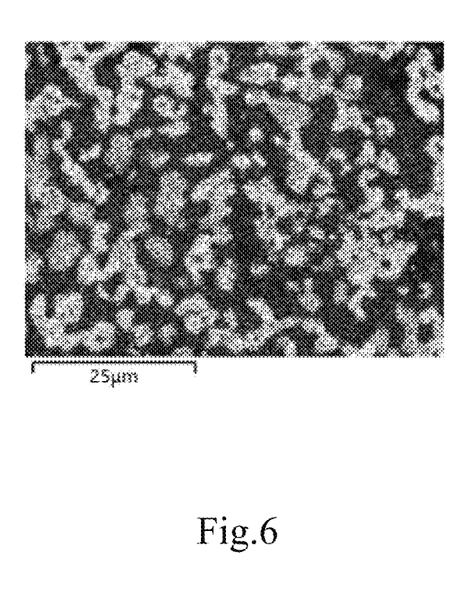
FIG. 6 is an SEM image of the matrix portion of Example 15 (drawing substitute).

FIGS. 3 and 4 show elemental mapping images of Cr. These images were each taken for the entirety of the respective sintered valve seats, including hard particles. FIG. 3 shows Comparative Example 4, and FIG. 4 shows Example 15. While the distribution of Cr is uneven in Comparative Example 4, Cr is uniformly distributed in Example 15. FIGS. 5 and 6 are images of the matrix portions of FIGS. 3 and 4, respectively.

The invention claimed is:

1. An iron-based sintered alloy valve seat used in an internal combustion engine using a hydrogen gas fuel,
wherein a Cr content is 13% by mass to 23% by mass, a Mo content is 5% by mass to 20% by mass, a Cu content is 10% by mass to 23% by mass, a Co content is 3% by mass or more, and a total content of Cr, Mo, and Co is 14% by mass to 47% by mass with respect to a total mass of the sintered alloy valve seat.

2. The iron-based sintered alloy valve seat according to claim 1, wherein
Cr-containing hard particles A and Mo-containing hard particles B are dispersed in a matrix,
the hard particles A comprise 8% by mass to 32% by mass of Cr, the matrix comprises 5% by mass to 25% by mass of Cr, and the hard particles B comprise 50% by mass to 75% by mass of Mo, and
the sintered alloy valve seat is infiltrated with Cu.

3. The iron-based sintered alloy valve seat according to claim 2, wherein
the hard particles A comprise Cr, Co, Mo, Ni, and C, with a remainder being Fe and impurities, and the hard particles A have a hardness of 550HV0.1 to 1,050HV0.1, and
the hard particles B have a hardness of 850HV0.1 to 1,600HV0.1.

4. The iron-based sintered alloy valve seat according to claim 1, wherein, when a cross-section obtained by cutting the valve seat in a direction perpendicular to a circumferential direction is observed, the valve seat has a porosity of 3% by mass or less and a Cu area ratio of 8% by mass to 20% by mass.

5. The iron-based sintered alloy valve seat according to claim 1, wherein, when a component analysis is performed under the following conditions for an analysis area of 25 μm×25 μm at a cross-section obtained by cutting the valve seat in a direction perpendicular to a circumferential direction, a region where the Cr content is less than 2% by mass, the Mo content is less than 30% by mass, and the Cu content is less than 2% by mass is absent
<Conditions>
Measurement apparatus: electron microscope SU3800, manufactured by Hitachi, Ltd.
EDS: UltimMax 65, manufactured by Oxford Instruments, plc.
Measurement conditions:
Accelerating voltage=15 kV
Spot intensity=80
WD (working distance)=10 mm.

6. The iron-based sintered alloy valve seat according to claim 2, wherein, when a component analysis is performed under the following conditions for an analysis area of 25 μm×25 μm at a cross-section obtained by cutting the valve seat in a direction perpendicular to a circumferential direction, a region where the Cr content is less than 2% by mass is absent, except for a region occupied by the hard particles B and a region infiltrated with Cu
<Conditions>
Measurement apparatus: electron microscope SU3800, manufactured by Hitachi, Ltd.
EDS: UltimMax 65, manufactured by Oxford Instruments, plc.
Measurement conditions:
Accelerating voltage=15 kV
Spot intensity=80
WD (working distance)=10 mm.

7. The iron-based sintered alloy valve seat according to claim 2, wherein Cr contained in the matrix comprises a Cr carbide.

8. The iron-based sintered alloy valve seat according to claim 1, having a surface hardness of HRC40 to HRC60.

9. The iron-based sintered alloy valve seat according to claim 1, which is a sintered valve seat used in a spark ignition engine.

* * * * *

UNITED STATES PATENT AND TRADEMARK OFFICE
CERTIFICATE OF CORRECTION

PATENT NO. : 12,049,689 B2
APPLICATION NO. : 18/279539
DATED : July 30, 2024
INVENTOR(S) : Koki Maeda et al.

Page 1 of 1

It is certified that error appears in the above-identified patent and that said Letters Patent is hereby corrected as shown below:

In the Claims

At Column 12, Line 16, "UltimMax 65," should be -- Ultim Max 65, --.

At Column 12, Line 33, "UltimMax 65," should be -- Ultim Max 65, --.

Signed and Sealed this
Eighteenth Day of March, 2025

Coke Morgan Stewart
*Acting Director of the United States Patent and Trademark Office*